(12) United States Patent
Cho et al.

(10) Patent No.: US 7,012,962 B1
(45) Date of Patent: Mar. 14, 2006

(54) SYSTEM AND METHOD FOR CODING AND DECODING PICTURE SIGNALS BASED ON A PARTITION TABLE INCLUDING LENGTH INFORMATION

(75) Inventors: Hyun Duk Cho, Kyonggi-do (KR); Victor V. Redkov, St. Petersburg (RU); Anatoli I. Tikhotski, St. Petersburg (RU); Alexandr L. Maiboroda, St. Petersburg (RU); Eugene V. Djourinski, St. Petersburg (RU); Sergei V. Smolentsev, St. Petersburg (RU)

(73) Assignee: LG Information & Communications, Ltd., Seoul (KR)

( * ) Notice: Subject to any disclaimer, the term of this patent is extended or adjusted under 35 U.S.C. 154(b) by 466 days.

(21) Appl. No.: 09/630,708

(22) Filed: Aug. 1, 2000

(30) Foreign Application Priority Data

Aug. 2, 1999  (KR) ............................... 1999-31732

(51) Int. Cl.
*H04N 7/12*  (2006.01)

(52) U.S. Cl. ............................... 375/240.26

(58) Field of Classification Search ........... 375/240.16, 375/240.23, 240.27, 240.26; 382/232; 386/33; 370/537

See application file for complete search history.

(56) References Cited

U.S. PATENT DOCUMENTS

| | | | | |
|---|---|---|---|---|
| 5,068,744 | A * | 11/1991 | Ito .............................. | 386/33 |
| 5,852,469 | A * | 12/1998 | Nagai et al. ........... | 375/240.23 |
| 5,896,176 | A * | 4/1999 | Das et al. ............. | 375/240.23 |
| 5,930,395 | A * | 7/1999 | Nagai et al. ................ | 382/232 |
| 6,363,061 | B1 * | 3/2002 | Yuzawa ..................... | 370/537 |
| 6,754,277 | B1 * | 6/2004 | Heinzelman et al. .. | 375/240.27 |

* cited by examiner

*Primary Examiner*—Young Lee
(74) *Attorney, Agent, or Firm*—Fleshner & Kim LLP

(57) ABSTRACT

Method for encoding and decoding a picture signal for detecting and correcting errors in a new structured GOB according to a data partition technique, method for encoding a picture signal, including the steps of (1) grouping picture information of one block group into respective information regions of each block, and partitioning to relevant regions, and (2) forming a partition table having length information of the partitioned regions of the grouped respective information regions.

30 Claims, 3 Drawing Sheets

SYSTEM AND METHOD FOR CODING AND DECODING PICTURE SIGNALS BASED ON A PARTITION TABLE INCLUDING LENGTH INFORMATION

BACKGROUND OF THE INVENTION

1. Field of the Invention

The present invention relates to a picture system, and more particularly, to a method for encoding and decoding a picture signal for detecting and correcting errors in a new structured GOB according to a data partition technique.

2. Background of the Related Art

In general, if a signal to be transmitted or stored is represented with a series of different symbols, coding is representation of each of the symbols with a length of code, wherein representation of each symbol with the same lengths of codes is called as a fixed length coding, and representation of each symbol with different lengths of codes is called as a VLC (Variable Length Coding). In the VLC in which respective symbols are represented with different lengths of codes, codes with short lengths are assigned to the symbols with a high frequency of occurrence in view of probability, and codes with relatively long lengths are assigned to the symbols with a low frequency of occurrence in view of probability, resulting to represent the signal with a less number of bits compared to the fixed length coding in which the same lengthed symbols are assigned to all symbols. However, though the VLC is efficient in compressing an amount of information, the VLC has the following disadvantages compared to the fixed length coding in an environment channel errors are occurred, frequently. That is, in the case of the fixed length coding, when the codes representing a symbol is contaminated by a channel error, only the symbol is affected. However, in the case of VLC, as the codes for each symbol has a proper length, if a channel error is occurred at a symbol coded to a particular length, not only the contaminated symbol, but also following successive symbols are affected because the codes contaminated by the error can be mistaken as codes for other symbol, i.e., even synchronization information for each code can be lost. In conclusion, when information is compressed by the VLC in transmission of information in an environment of high channel error occurrence, a method for supplementing the disadvantage is required. One of the most general supplementing method is to provide a system as shown in FIG. 1. FIG. 1 illustrates a block diagram showing a system provided for supplementing the disadvantage of the related art VLC.

Referring to FIG. 1, on the transmitter side, a channel encoding part 3 is connected to a rear end of a source coding which contains variable length coding part 2. And, on the receiver side, a source decoding block 5 is connected to a rear end of a channel decoding part 4. The channel encoding part 3 adds a redundancy to a picture received through a camera before coding the picture, so that the channel decoding part 4 on the receiver side can detect occurred error and restore an original picture even if there is a channel error occurred. Though this is for enhancing a resilience to the error occurrence, since the redundancy is added without information on a GOB (Group Of Block) to be subjected to VLC, this may deteriorate a compression efficiency, significantly. To cope with this problem, other techniques for removing the error are employed recently, having a higher resilience for the channel error occurrence. One of the representative algorithms is the coding technique recommended by H.263 of ITU-T, another is the coding technique recommended by the MPEG-4 in the IEC (International Electrotechnical Commission) of the ISO (International Organization for Standardization). The techniques are the resynchronization, the data partitioning, the reversible variable length codes, which can provide an error compensation of approx. 2~3 dB, presently. The data partitioning is one of technique for enhancing resilience to the channel error occurrence, together with the channel coding.

The channel coding and the data partitioning will be explained in more detail. In the channel coding, the Reed-Solomon code, the BCH code (Bose-Chaudhuri-Hocquenghem code), or the convolution code are used as one of error correction code. The channel coding by using the BCH code is one of block coding method for detection of random errors and error correction of independent various bits. The block coding method is a coding method in which information bits to be transmitted is partitioned into fixed sizes of blocks, and parity bits, error detection bits, are added to each of the blocks. However, the channel coding by using the Reed-Solomon code is one of block coding for burst error detection and correction. What the two block coding methods of the channel coding have in common is the partition into fixed sizes of blocks and addition of redundancy bits thereto for protection of the blocks. In this instance, the blocks are partitioned without considering information on the codes of the blocks, at all.

The data partition technique will be explained. For reference, in the case of moving picture compression recommended by the MPEG-4, the VLC picture is partitioned in GOBs. The GOB includes headers, moving vectors, and discrete cosine transform coefficients. FIG. 2 illustrates a GOB partition structure according to the related art data partition technique.

Referring to FIG. 2, in the related art data partition, a data is partitioned into three GOB regions 11, 13 and 15 of headers, moving vectors, and discrete cosine transform coefficients. The three regions 11, 13 and 15 are regions of the header, the moving vector, and the discrete cosine transform coefficient of each of 8 macro blocks in the GOB. There are partition markers 12 and 14 provided between the three regions 11, 13, and 15 for making the three regions 11, 13, and 15 distinctive. And, there is a resynchronization marker 10 added to a front of the GOB, so that the source decoding part in FIG. 1 can detect a starting point of the next GOB when damage to a portion of the GOB by an error is detected. The contents of the GOB is partitioned into the three regions because, though restoration of the picture is very difficult if the header region 11 is damaged by the error, a close restoration of an original picture is possible comparatively by using information in the header region 11 when only the moving vector region 13 is damaged, and a very close restoration of an original picture is possible by using information in the header region 11 and the moving vector region 13 when only the discrete cosine transform coefficient region 15 is damaged. If the contents of the GOB is not partitioned thus, even if the discrete cosine transform coefficient region 15 is damaged, since the receiver side can not know whether the discrete cosine transform coefficient region 15 is damaged, or the header region 111 or the moving vector region 13 is damaged, a result that the entire GOB is damaged is brought about.

However, the related art channel coding and data partition have the following problems.

First, even if the GOB is partitioned into different information regions, the related art data partition has no method for protecting the partitioned regions individually, and, when the partition marker used for making the respective regions distinctive is damaged by the error, affect of the damage will be great. Nevertheless, it has been difficult to add any device for protecting the damage to the partition marker as a method for solving the problem.

Second, the provision of redundancy regardless of the contents of the variable length coded GOB in the related art channel coding for enhancing resilience to the error occurrence drops a compression efficiency, significantly.

SUMMARY OF THE INVENTION

Accordingly, the present invention is directed to a method for encoding and decoding a picture signal that substantially obviates one or more of the problems due to limitations and disadvantages of the related art.

One object of the present invention is to provide a method for encoding and decoding a picture signal, for reducing a drop of compression efficiency, and enhancing a resilience to an error occurrence.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for encoding a picture signal includes the steps of (1) grouping picture information of one block group into respective information regions of each block, and partitioning to relevant regions, and (2) forming a partition table having length information of the partitioned regions of the grouped respective information regions.

Preferably, the picture information of the block group is partitioned into a header region having a group of respective headers of a plurality macro blocks, a motion vector region having a group of respective motion vectors of the plurality of macro blocks, and a discrete cosine transform coefficient region having a group of respective discrete cosine transform coefficient region of the plurality of macro blocks.

And, the channel coding for the block group is carried out, with the regions given redundancies different from one another taking protection levels of the regions into account, and then transmitted in an order of the resynchronization marker, partition table, the header region, the motion vector region, the discrete cosine transform region.

Length information for respective partitioned regions each recorded in a number of bits on the partition table is determined by converting a maximum length of each of the partitioned regions into a number of bits.

The method for decoding a picture signal of the present invention includes the steps of analyzing the transmitted partition table after the transmission step at first for understanding respective partition regions, and decoding bits of understood respective partition regions, independently.

In another aspect of the present invention, there is provided a method for decoding a picture signal including the steps of (1) channel decoding, and analyzing the partition table of the transmitted partition table at first, to understand lengths of respective partition regions, and (2) channel decoding respective partition regions according to the understood lengths of the partition regions, independently.

Preferably, if a portion of the block group is damaged by error such that detection of a boundary of the block group is difficult in the channel decoding step, a starting point of the block group to be transmitted at the next time can be detected by using length information recorded on the partition table, and propagation of error to the next block group is prevented.

The channel encoding and decoding permit independent coding and coding protection level set up for each of the partitioned regions based on length information for each partitioned region recorded on the partition table.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings. The data partition of the present invention suggests to use, not the present partition markers, but a partition table in partitioning a region of a GOB according to contents of information of the GOB, on which length information of respective regions is recorded for informing length information of an entire GOB. And, though the channel coding is applied, the channel coding is applied to each partitioned region in the GOB structure, individually. A protection level for error is made higher for each of the partitioned regions individually according to an importance of each region, for enhancing a restoring capability.

Figure 3:
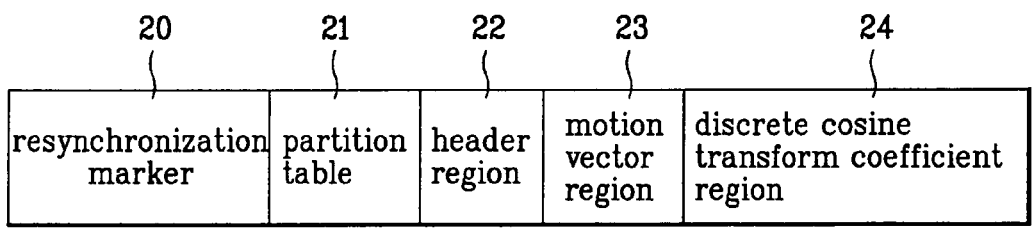
FIG. 3 illustrates a GOB partition structure according to a method for partitioning a data in accordance with a preferred embodiment of the present invention; and, FIG. 4 illustrates a system of explaining the steps of encoding and decoding a picture signal in accordance with a preferred embodiment of the present invention.

FIG. 3 illustrates a GOB partition structure according to a method for partitioning a data in accordance with a preferred embodiment of the present invention.

Referring to FIG. 3, in the method for encoding and decoding a picture signal of the present invention, each of GOBs is partitioned into three regions 22, 23 and 24 of a header, motion vector, and discrete cosine transform coefficient. The three regions 22, 23 and 24 are groups of headers, motion vectors, and discrete cosine transform coefficients of 8 macro blocks in the GOB. And, in order to mark the three partitioned regions 22, 23 and 24, information on a length of each partitioned region, i.e., a partition table 21 having a number of bits of each partitioned region recorded thereon, is disposed in front of the partitioned regions. Information on a length of each partitioned region recorded in the number of bits on the partition table 21 is fixed by converting a maximum length of each region into a number of bit. That is, if the header has a maximum length of approx.

10, 4 bits are assigned, if the header has a maximum length of 80, 7 bits are assigned, and a length discrete cosine transform coefficient has a maximum 1000, 10 bits are assigned. And, identical to the related art GOB structure, in the present invention, a resynchronization marker 20 is added to a front side of the partition table 21 identical to the present GOB structure selectively, so that a decoding part 32 in FIG. 4 can find the next GOB when a portion of the partition table 21 of the GOB is damaged by the error. In this instance, in the present invention, the resynchronization marker is added selectively, since the partition table 21 has information on lengths of the partitioned regions, as far as the partition table is not damaged by an error, the resynchronization marker is not required. For this, because the partition table 21 has the highest importance of the GOB in the channel coding of the present invention, a protection level for the partition table 21 is made relatively higher for reducing a necessity for the resynchronization marker 20. Particularly, in the channel coding, no fixed redundancy is provided to each of the partitioned regions 22, 23 and 24, but an individual redundancy is provided to each of the partitioned regions 22, 23, and 24. That is, the importance of respective regions is in the order of the partitioned table 21 region, the header 22 region, motion vector 23 region, and discrete cosine transform coefficient 24 region. Therefore, the more redundancy is provided to a region having relatively higher importance. Application of such an individual channel coding is made possible from the fact that the partitioned table 21 has information on lengths of all partitioned regions 22, 23 and 24 recorded thereon, from which information on a length of entire GOB can be known. Since a boundary of each partitioned region can be known only when the partition marker is found in the related art coding, the individual channel coding for every partitioned region is very difficult. Therefore, the related art channel coding cannot, but be conducted uniformly for the GOB, without partitioning the regions of the GOB.

Figure 4:
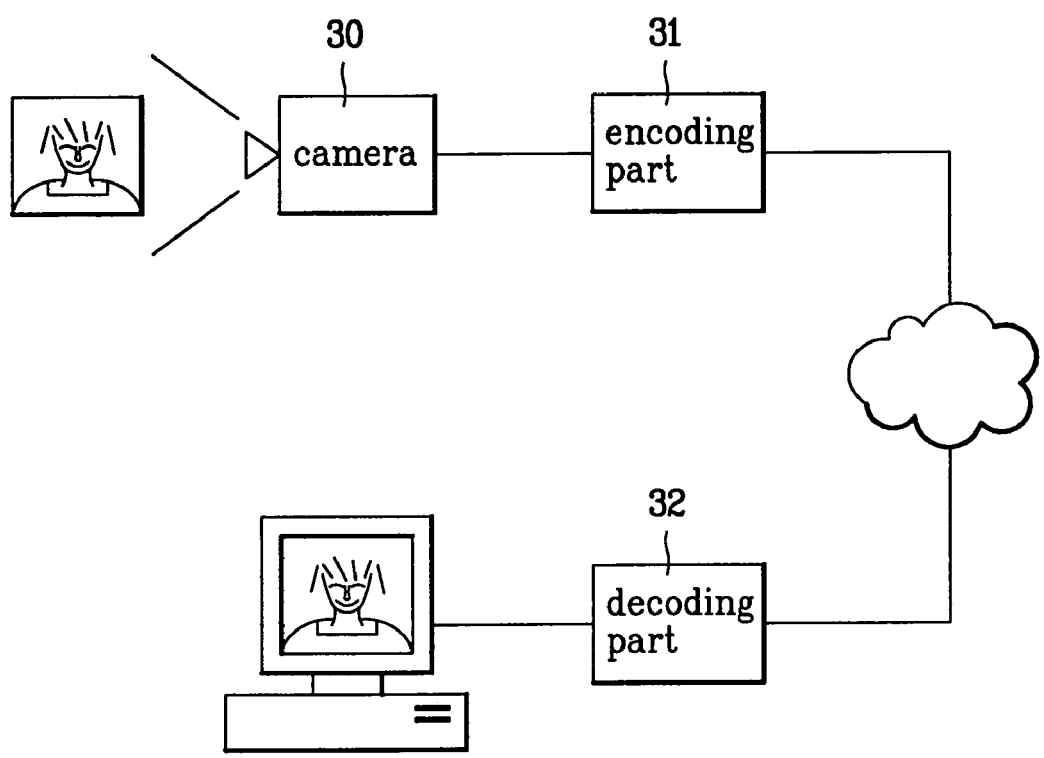

Since the present invention applies the variable length coding to the channel coding for independent channel coding of each partitioned region, as shown in FIG. 4, a device for encoding and decoding a picture signal used in accordance with a preferred embodiment of the present invention may include a system in which the related art variable length coding part and the channel coding part are combined. FIG. 4 illustrates a system of explaining the steps of encoding and decoding a picture signal in accordance with a preferred embodiment of the present invention.

Before carrying out coding according to the present invention, a GOB is formed in a structure as shown in FIG. 3. After calculation of picture information on the header, the motion vector, and discrete cosine transform coefficients of each macro block, the picture information is grouped by information characteristics. That is, the headers are grouped with headers, the motion vectors are grouped with the motion vectors, and DCT coefficients are grouped with the DCT coefficients of the macro blocks in the GOB. Then, length information for each partitioned region grouped thus is extracted, and a partition table having information on lengths of respective partitioned regions is formed. Thus, by providing length information of picture information, such as a discrete cosine transform coefficient by the variable length coding, independent channel coding for each partitioned region is possible, that in turn permits provision of independent redundancy to each partitioned region, and prevents an error propagation over the partitioned region. For example, in a case of a block channel coding, such as a BCH coding, a size of a block region can be adjusted such that no more than two partitioned regions are contained, and in the case of convolution code too, channel code unit can be set such that no more than one partitioned region is exceeded. And, the resynchronization marker can be added to every block group, selectively. Then, the encoding part 31 in FIG. 4 carries out channel coding different between protection levels of respective information of the partitioned regions. For example, the channel coding is carried out independently in the order of the partition table, the header regions, the motion vector regions, and the discrete cosine transform coefficient regions. In this instance, though the channel coding can be carried out independently according to the protection levels for errors of respective partitioned regions, the channel coding may be carried out independently according to the same protection levels for entire partitioned regions of the GOB, at times. Thus, the encoding part 31 carries out independent channel coding for the partitioned regions, for prevention of propagation of errors from one partitioned region to other partitioned regions. The GOB channel coded thus is transmitted in an order of the resynchronization marker, the partition table, the header region, the motion vector region, and the discrete cosine transform coefficient region. Then, at first, after the decoding part 32 subjects the partition table to channel decoding, the decoding part 32 subjects each of the partition regions to channel decoding based on information on lengths of each partition region analyzed in the course of decoding of the partition table. In the channel decoding of each of the partitioned regions, bits in each of the partitioned regions can be channel decoded independently again because boundaries of respective partitioned regions of the received signal can be known from length information of each of the partitioned regions and the coding protection levels on the partition table. During such encoding and decoding procedures, if a portion of bits of the GOB is damaged by an error, information is lost for a partitioned region containing the damaged bit in the present invention, and the decoding part 32 can restore an image close to an original image by using information on rest of the partitioned regions.

The damage to a part of bits of the GOB can be known according to the following methods.

First, the damage to a part of bits can be verified by detection of changed bits in the channel encoding and decoding.

Second, the damage to a part of bits can be verified by presence of codes not consistent to a code syntax which is a series of rules for the encoded GOB bits during the channel decoding.

Third, the damage to a part of bits can be verified by confirming that the channel decoding is made matched to the boundaries of each of the partitioned regions. That is, in the process of the channel decoding, even if a boundary of one partitioned region is passed, if the channel decoding is kept on for the partitioned region, it can be known that bits of a part of the GOB is damaged. That is, when information length recorded on the partition table is not consistent to a decoded portion, it can be known that bits of a part of the GOB is damaged.

Of the above three, in the case the channel decoding is carried out not matched to each boundary of respective partition regions, that is an error propagation is occurred, the present invention prevents continuation of a wrong channel decoding by using length information on the partition table. That is, the partitioned region damaged by the error is skipped to start the channel decoding from the next partitioned region by using the length information on the partition table. And, in the case bits of a part of the GOB are damaged by error, after an image closest to an original image is restored by using information on other undamaged partitioned regions, decoding for the GOB should be carried out, for which a starting point of the next GOB should be known. To do this, though the related art employs the resynchronization marker, as, not only the length information for each partitioned region, but also an entire GOB length can be known from the partitioned table in the present invention, a starting point of the next GOB can be known by using the length information on the partitioned table and the protection levels. Though this method requires an assumption that the partition table is not damaged by the error, there is almost no possibility of damage because, in the present invention, the channel coding is carried out with a high redundancy considering an importance of the partition table. Accordingly, the GOB of the present invention requires no resynchronization marker. However, the damage will be serious if the partition table is damaged in a state the resynchronization marker is not present, the resynchronization marker may be inserted selectively. Eventually, in the present invention, the partition table and the resynchronization marker are made to complement each other.

As can be known from the forgoing description, information on the partition table is the most important of all information of the GOB in the present invention. And, importance of information of each of the partitioned regions differ, in general, in a descending order starting from the header region, the motion vector region, and the discrete cosine transform coefficient region. Therefore, in the present invention, each region of the GOB is channel coded with a redundancy taken a protection level into account based on importance of the region. In more detail, the partition table which has the highest protection level for error is channel coded with a high redundancy, and the redundancy is lowered in the order of the header region, the motion vector region, the discrete cosine transform coefficient region for rest of partition regions in the channel coding.

As another embodiment of the present invention, after each of the partition regions are channel coded, lengths of the partition regions on the partition table are transported, for receiving and making an independent decoding of each of the partition regions.

Figure 1:
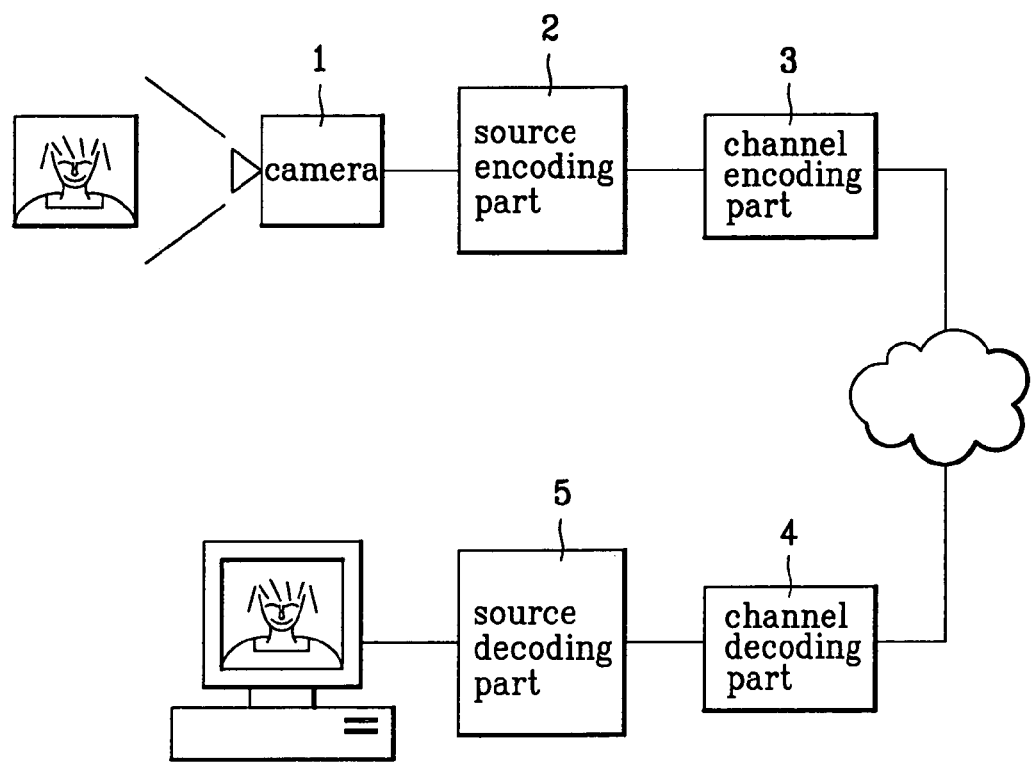
FIG. 1 illustrates a block diagram showing a system provided for supplementing the disadvantage of the related art VLC.
Figure 2:
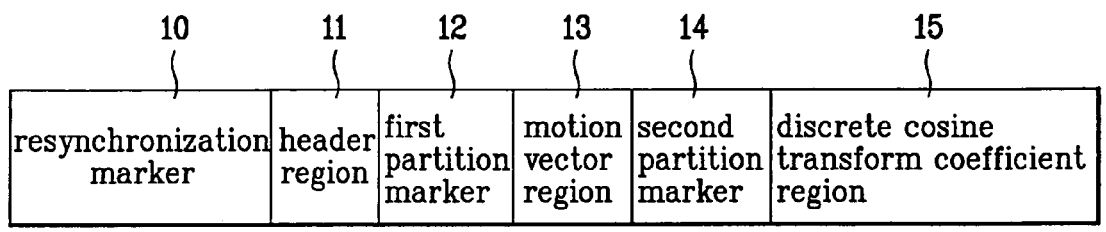
FIG. 2 illustrates a GOB partition structure according to the related art data partition technique.

Separate from this, the method for coding and decoding a picture signal of the present invention may be applied to the related art GOB partition structure, wherein, referring to the related art GOB partition structure in FIG. 2, the channel coding is carried out with a high redundancy provided to the partition markers which have relatively high importance compared to the other partition regions and the highest protection level for the error, and with lower redundancies provided in a descending order starting from the header region, the motion vector regions, and the discrete cosine transform coefficient region in the partition region.

Application of the procedure for encoding and decoding a picture signal of the present invention explained until now to a picture transmission mobile station in which the channel coding is regarded important can provided a great effect.

As has been explained, the method for encoding and decoding a picture signal of the present invention has the following advantages.

First, by adding a partition table having length information on each GOB partition region to the GOB, by using, not the partition marker, but the data partition technique, an error can be detected and corrected effectively through coding and encoding an image.

Second, because the channel coding and decoding is carried out with different redundancies provided to each partition region according to protection level for errors of each partitioned region, a maximum length of error propagation can be limited to one partition region. That is, by using the length information of the partition table, continuous advance of a wrong decoding over the partition regions is prevented.

It will be apparent to those skilled in the art that various modifications and variations can be made in the method for encoding and decoding a picture signal of the present invention without departing from the spirit or scope of the invention. Thus, it is intended that the present invention cover the modifications and variations of this invention provided they come within the scope of the appended claims and their equivalents.

The invention claimed is:

1. A method for communicating information over a network, comprising:
   (1) partitioning picture information of one block group into respective information regions;
   (2) forming a partition table having length information indicating a length of each of the information regions;
   (3) encoding a picture signal to include the partition table and the information regions; and
   (4) transmitting the picture signal through the network, wherein the length information in the partition table includes a plurality of bit-length numbers, each representing a number of bits allocated to a respective one of the information regions in the transmitted picture signal, wherein the information regions include:
   a header region having a group of respective headers of a plurality of macro blocks;
   a motion vector region having a group of respective motion vectors of the plurality of macro blocks, and
   a discrete cosine transform coefficient region having a group of respective discrete cosine transform coefficients of the plurality of macro blocks.

2. A method as claimed in claim 1, further comprising:
   channel coding the information regions in redundancies depending on an order of importance of the information regions indicated in the partition table.

3. A method as claimed in claim 2, wherein the channel coding is performed with a greater amount of redundancy for an information region having a higher order of importance indicated in the partition table than for an information region having a lower order of importance.

4. A method as claimed in claim 1, further comprising:
   adding resynchronization markers for marking the block group.

5. A method as claimed in claim 1, further comprising:
   forming the partition table by converting a maximum length of each of the information regions into a number of bits.

6. A method as claimed in claim 1, wherein the partition table is located at a position in front of the information regions in the picture signal.

7. A method as claimed in claim 1, wherein each bit-length number is different from a code used to represent information in a respective one of the information regions.

8. A method as claimed in claim 1, wherein each bit-length number represents a maximum number of bits allocated to a respective one of the information regions in the picture signal.

9. A method as claimed in claim 1, further comprising:
   decoding the picture signal based on the length information in the partition table transmitted in the picture signal.

10. A method as claimed in claim 9, wherein said decoding includes:
determining bit positions of each of the information regions in the picture signal based on the length information in the transmitted partition table.

11. A method as claimed in claim 9, wherein said decoding includes:
channel decoding the information regions based on the length information in the partition table transmitted in the picture signal.

12. A method for encoding a picture signal, comprising:
forming a header region having a group of respective headers of a plurality of macro blocks, a motion vector region having a group of respective motion vectors of the plurality of macro blocks, and a discrete cosine transform coefficient region having a group of respective discrete cosine transform coefficients of the plurality of macro blocks,
forming a partition table having length information including a plurality of bit-length numbers, each representing a number of bits allocated to a respective one of the header region, the motion vector region, and discrete cosine transform coefficient region in the encoded picture signal; and
transmitting the partition table with the header region, motion vector region, and discrete cosine transform coefficient region encoded picture signal over a communications network.

13. A method as claimed in claim 12, further comprising:
transmitting a resynchronization marker with the partition table.

14. A method as claimed in claim 13, wherein the resynchronization marker is transmitted before the partition table.

15. A method as claimed in claim 13, wherein a predetermined number of the regions are channel coded in redundancies different from one another.

16. A method as claimed in claim 15, wherein the partition table includes information indicating an order of importance of the header region, the motion vector region, and the discrete cosine transform region, and wherein redundancy in the channel coding is performed based on the order of importance indicated in the partition table.

17. A method as claimed in claim 12, wherein the transmitting step includes transmitting the partition table, the header region, the motion vector region, and the discrete cosine transform region in order.

18. A method for decoding picture signals, comprising:
(1) receiving a picture signal transmitted through a network, the picture signal including information regions of a block group and a partition table having length information on the information regions;
(2) analyzing the partition table to determine the length of each information region; and
(3) decoding the partition regions according to the length information, wherein the length information includes a plurality of bit-length numbers, each representing a number of bits allocated to a respective one of the information regions in the picture signal, and wherein the information regions include:
a header region having a group of respective headers of a plurality of macro blocks;
a motion vector region having a group of respective motion vectors of the plurality of macro blocks, and
a discrete cosine transform coefficient region having a group of respective discrete cosine transform coefficients of the plurality of macro blocks.

19. A method for decoding a picture signal, comprising:
(1) receiving a picture signal from a communications network, the picture signal including information regions of a block group and a partition table region having length information on the information regions, said information regions being channel coded in redundancies different from one another;
(2) analyzing the partition table to determine the length information of the information regions in the received picture signal; and
(3) channel decoding the information regions according to the length information, wherein the length information includes a plurality of bit-length numbers, each representing a number of bits allocated to a respective one of the information regions in the picture signal, and wherein the information regions include:
a header region having a group of respective headers of a plurality of macro blocks;
a motion vector region having a group of respective motion vectors of the plurality of macro blocks, and
a discrete cosine transform coefficient region having a group of respective discrete cosine transform coefficients of the plurality of macro blocks.

20. A method for communicating information over a network, comprising:
grouping picture information from a plurality of blocks into information regions, the information regions including (a) a header region having a group of headers from the blocks, (b) a motion vector region having a group of motion vectors from the blocks, and (c) a discrete cosine transform coefficient region having discrete cosine transform coefficients from the blocks;
partitioning the regions;
forming a partition table which includes length information for each of the regions;
encoding a picture signal to include the partition table and regions; and
transmitting the picture signal through the network, wherein the length information in the partition table includes a plurality of bit-length numbers, each representing a number of bits allocated to a respective one of the regions in the transmitted picture signal.

21. A method as claimed in claim 20, further comprising:
channel coding the regions in redundancies depending on an order of importance of the regions indicated in the partition table.

22. A method as claimed in claim 21, wherein the channel coding is performed with a greater amount of redundancy for a region having a higher order of importance indicated in the partition table than for a region having a lower order of importance.

23. A method as claimed in claim 20, further comprising:
adding a resynchronization marker to the information regions and the partition table.

24. A method as claimed in claim 20, further comprising:
forming the partition table by converting a maximum length of each region into a number of bits.

25. A method as claimed in claim 20, wherein the partition table is located at a position in front of the regions in the picture signal.

26. A method as claimed in claim 20, wherein each bit-length number is different from a code used to represent information in a respective one of the regions.

27. A method as claimed in claim 20, wherein each bit-length number represents a maximum number of bits allocated to a respective one of the regions in the picture signal.

28. A method as claimed in claim 20, further comprising:
    decoding the picture signal based on the length information in the partition table transmitted in the picture signal.

29. A method as claimed in claim 28, wherein said decoding includes:
    determining bit positions of each of the regions in the picture signal based on the length information in the transmitted partition table.

30. A method as claimed in claim 28, wherein said decoding includes:
    channel decoding the regions based on the length information in the partition table transmitted in the picture signal.

* * * * *